(12) United States Patent
Kopf

(10) Patent No.: US 7,991,038 B2
(45) Date of Patent: Aug. 2, 2011

(54) LASER ARRANGEMENT AND RESONATOR ELEMENT FOR SUCH A LASER ARRANGEMENT

(75) Inventor: Daniel Kopf, Roethis (AT)

(73) Assignees: High Q Technologies GmbH, Roethis (AT); Daniel Kopf, Roethis (AT)

( * ) Notice: Subject to any disclaimer, the term of this patent is extended or adjusted under 35 U.S.C. 154(b) by 0 days.

(21) Appl. No.: 12/535,044

(22) Filed: Aug. 4, 2009

(65) Prior Publication Data

US 2011/0032968 A1 Feb. 10, 2011

(51) Int. Cl.
*H01S 3/08* (2006.01)
(52) U.S. Cl. ............................ 372/107; 372/98; 372/101
(58) Field of Classification Search .................... 372/92, 372/93, 98, 99, 101, 107, 108, 109
See application file for complete search history.

(56) References Cited

U.S. PATENT DOCUMENTS

| | | | |
|---|---|---|---|
| 3,624,351 A | 11/1971 | Kipp et al. | |
| 3,996,527 A | 12/1976 | Hernqvist | |
| 4,099,141 A | 7/1978 | Leblanc et al. | |
| 5,163,059 A | 11/1992 | Negus et al. | |

OTHER PUBLICATIONS

Seigman, Anthony E., "*Lasers*", University of Science Books, 1986, pp. 607-614.

*Primary Examiner* — Armando Rodriguez
(74) *Attorney, Agent, or Firm* — Muncy, Geissler, Olds & Lowe, PLLC

(57) ABSTRACT

In a laser arrangement comprising at least one laser medium for producing a laser emission, a laser resonator having a beam path with a length of at least 20 cm and with at least one end mirror, the beam path within the laser resonator is formed at least partly by free-beam optics. A resonator element arranged in the beam path has at least two optical surfaces as surfaces interacting with the radiation led via the beam path, these optical surfaces being rigidly connected to one another and being adjustable together in the beam path in such a way that, on tilting by an angle error, they achieve substantially the same effect on the guidance of the beam path but with opposite sign, so that mutual compensation of tilt errors takes place.

35 Claims, 4 Drawing Sheets

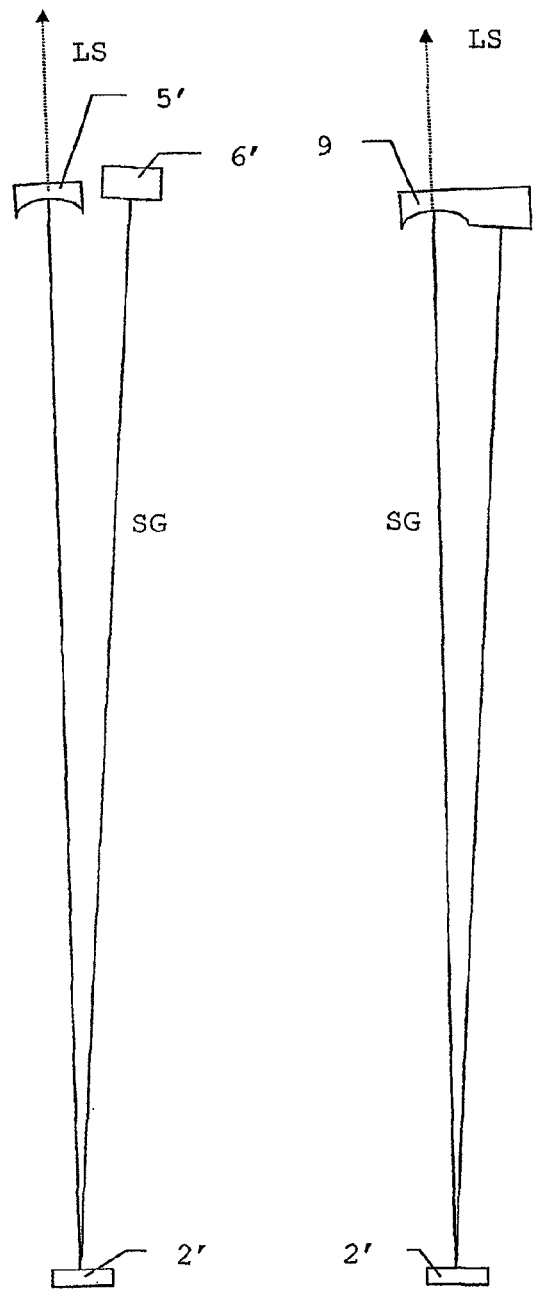
Prior Art

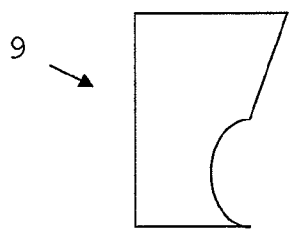
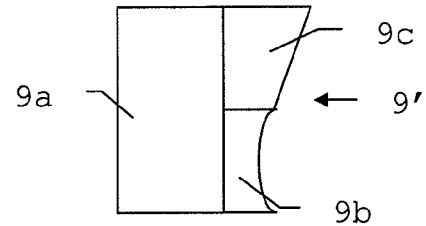
Fig. 4
Fig. 5
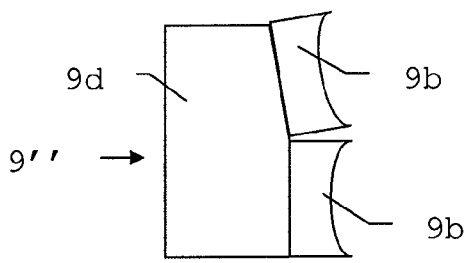
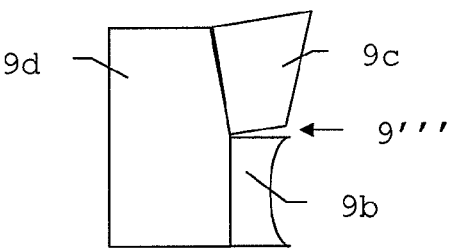
Fig. 6
Fig. 7
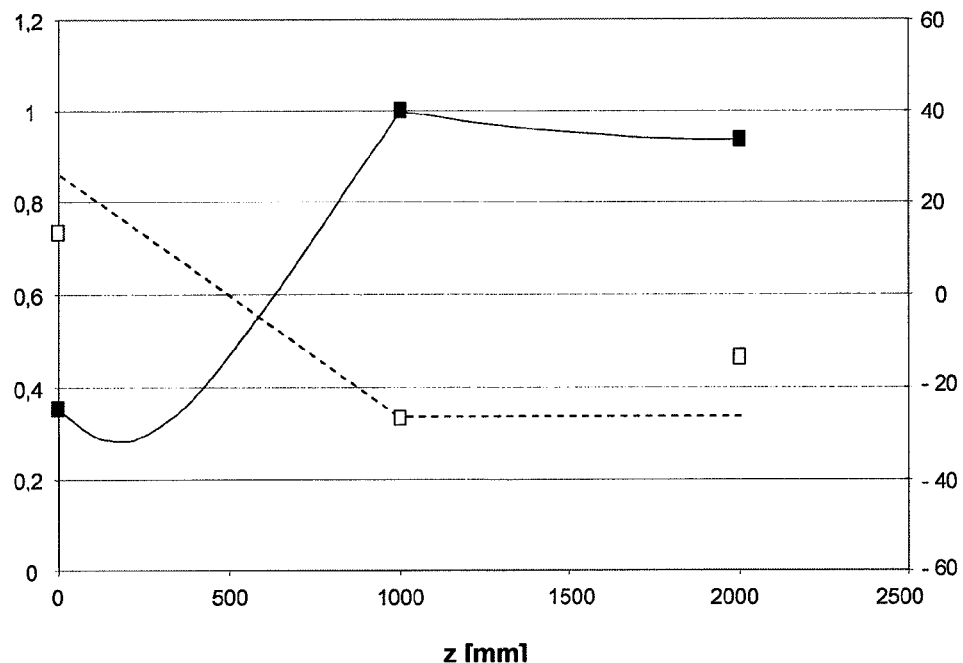
Fig. 8

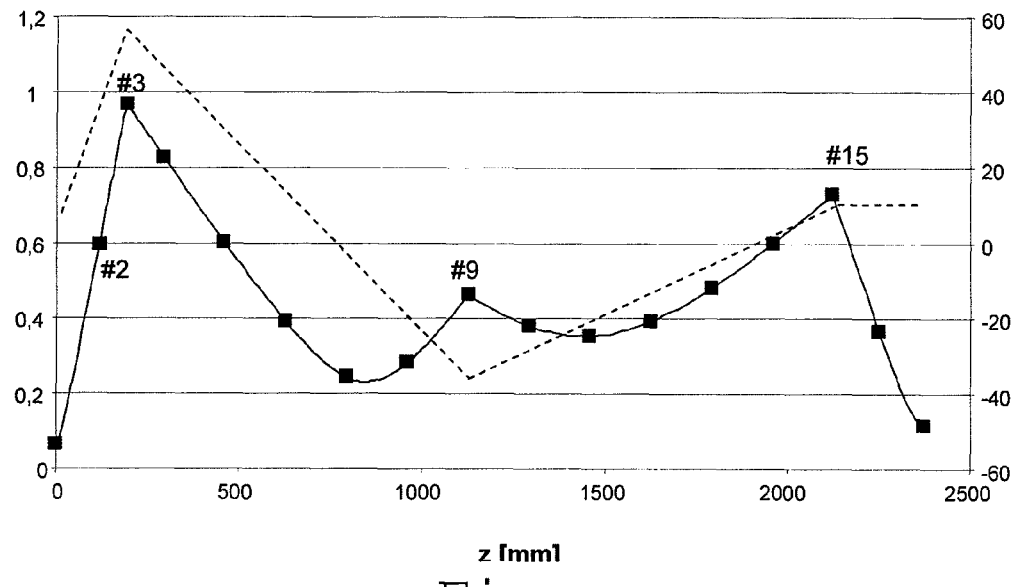
Fig. 9
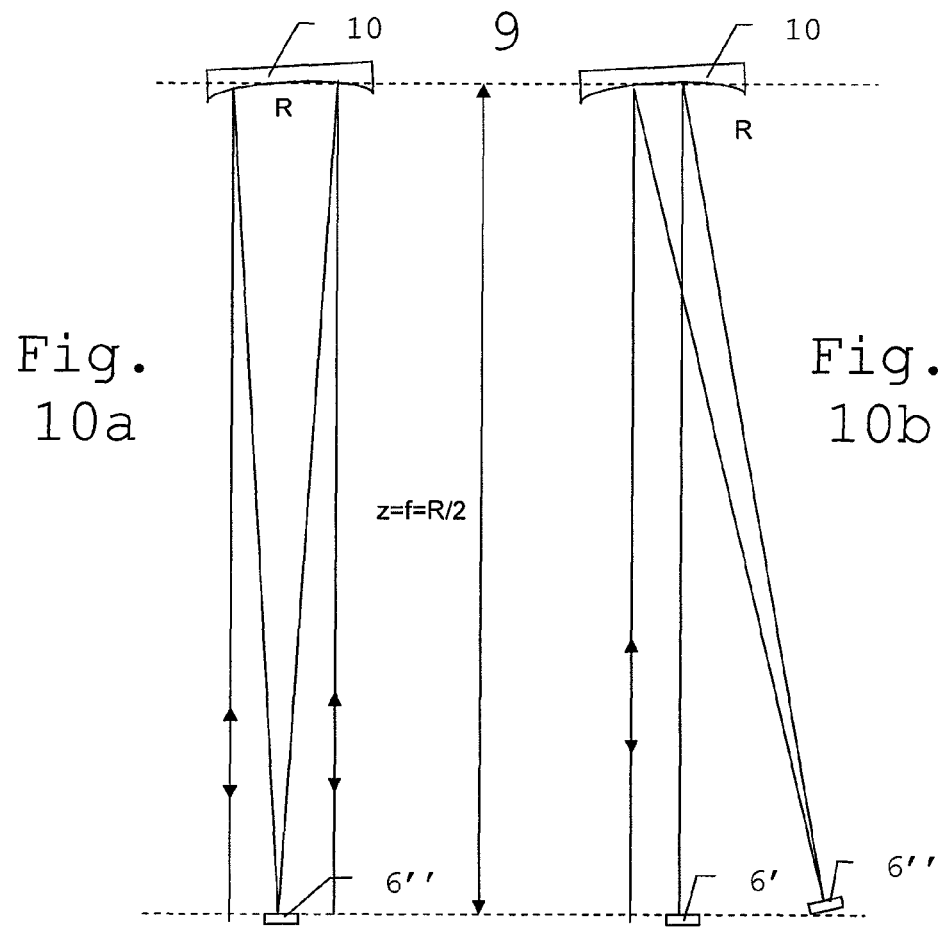
Fig. 10a
Fig. 10b

LASER ARRANGEMENT AND RESONATOR ELEMENT FOR SUCH A LASER ARRANGEMENT

The invention relates to a laser arrangement, in particular for producing or amplifying femto- or picosecond pulses, according to the preamble of claim 1 and a resonator element for arrangement in the beam path of a laser resonator of such a laser arrangement, according to the preamble of claim 15.

Ultra-short pulse laser systems, i.e. laser arrangements which are capable of producing or amplifying laser pulses having a characteristic pulse duration in the femto- or picosecond range, have long been known in various embodiments from the prior art, femtosecond and picosecond lasers being used in a growing number of applications of various types. Such laser systems use cavities or laser resonators having two mirror elements defining the beam path and a laser medium. Here, mode-coupled femtosecond and picosecond lasers use as a rule a so-called extended cavity with a multiplicity of mirror elements for beam guidance, folding of the beam path ensuring the desired compactness of the design. Such a design is relevant in particular when the pulse repetition frequency is to lie in the MHz range, for example in the case of a typical pulse repetition frequency in the range of 1-120 MHz. Such a repetition frequency requires, for maintenance of a practicable compactness, the use of such an extended cavity with two or more deflecting or folding mirrors which have a curvature or may be designed to be planar.

Typical resonators of such laser arrangements have a sensitivity of 50 μrad in the case of some elements, i.e. in the case of (undesired) tilting of an element out of the optimum state by this angle, a marked loss of performance of several percent results.

In the assembly of a laser resonator, it is usual for its mirror to be mounted on a common (base) plate, a common monolithic block or a common, mechanically stable (base) rod system as a base component. Usually, the actual mirrors, consisting of the actual reflective mirror coating, which was applied to a substrate, generally comprising glass, are first held in—generally metallic—mirror holders, which in turn are then fastened on the base or base component. This gives rise to the problem that at least two different materials inevitably come into contact with one another: glass as a mirror substrate on the one hand and metals, such as aluminum and stainless steel, on the other hand. The thermal expansion of these materials is substantially different, so that, in the case of changes in the temperature, either a tension and/or a displacement relative to one another result.

Angle stability of better than 50 μrad is therefore technically achievable with difficulty or only with considerably effort in the case of the assembly of materials having different coefficients of expansion, environmental influences and the changes over a time period of many years having to be taken into account. A typical condition to be complied with is that a mirror surface having an expansion of 10 mm at one end (relative to the other end) is permitted to deviate by not more than 0.5 μm, which corresponds to the abovementioned tilt sensitivity of 50 μrad. If it is taken into account that the tolerances of a plurality of mirror elements may be additive, the stability requirement for the individual mirror should be substantially increased. The surface roughness of milled or drilled metallic surfaces is usually Ra=0,4-0.8 μm and therefore cannot as a rule offer the desired contact accuracy.

An object of the present invention is the provision of an improved laser arrangement having an extended cavity, in particular for producing femto- or picosecond pulses.

A further object is the provision of such a laser arrangement which has increased robustness and stability of the performance parameters even over relatively long periods.

A further object is the provision of a laser arrangement which shows little reaction to deflection or deformation of the base plate or of the skeleton and is therefore also insensitive to external influences, such as temperature, mechanical stresses or gas or air pressure.

A further object is the provision of a laser arrangement in which the tilt sensitivity of resonator elements is compensated in that the emerging useful beam does not change in the beam attitude or does so to an insignificant extent.

These objects are achieved or the solutions are further developed by the subjects of claim 1 or 15 or of the dependent claims.

The invention relates to the design and use of resonator elements in the beam path of a laser arrangement having an extended cavity or an extended laser resonator. According to the invention, at least two components defining the laser resonator or present in its beam path and influencing it are combined here to form a common resonator element which is mounted in its totality in the beam path, in particular in a displaceable or adjustable arrangement. The optical surfaces of these components as transmission and/or reflection surfaces are rigidly connected to one another and jointly adjustable in the beam path in such a way that, on tilting—each by itself—through an incorrect angle, they achieve substantially the same effect on the guidance of the beam path but with opposite sign, so that mutual compensation of tilting errors by at least 50%, in particular more than 75%, is possible. Thus, the problem of a misadjustment or incorrect adjustment as a result of the use of specific optically active resonator elements is solved. The choice of the components to be combined to form such a resonator element and also the calculation of the effects in the resonator layout can be made on the basis of known methods. The elements of the laser cavity are chosen and arranged taking into account specific procedures for the design of resonators, so that the tilt sensitivity of the elements is reduced many times over, and a laser stable in the long term is therefore obtained in spite of the use of non-optimized optomechanical holders.

Such a known method is the ABCDEF formalism as a method for calculating the tilt sensitivity, as described, for example, in Seigman Anthony E.: "Lasers", University Science Books, 1986, pages 607-614. An extension of the ABCD matrix calculation method for the calculation of laser cavities to the so-called ABCDEF method of calculation, by means of which the tilt sensitivity of resonators can be calculated by means of the matrix elements "F", is described there. A—fictitious—folding mirror element which has a 3×3 matrix with the following values is installed within a resonator:

ABCDEF(100 μrad)={A,B,E;C,D,F;0,0,1}={1,0,0;0,1, $2 \cdot 10^{-4}$;0,0,1}.

Here, F is assigned a specific tilt angle value of $F=2 \cdot 10^{-4}$, which corresponds to a tilt of the optical axis by 200 μrad. This corresponds in reality to the installation of a (fictitious) planar folding mirror at the corresponding point in the resonator where the matrix ABCDEF (100 μrad) was inserted, this folding mirror element in reality having been "misadjusted" by an angle error of 100 μrad out of the optimal attitude. A reflection results in a deflection angle which is twice as large as the angle error. $F=2 \cdot 10^{-4}$ is therefore twice as large as the angle error of 100 μrad=$10^{-4}$.

Here, the calculation of the resonator axis on the basis of the ABCDEF method with a misalignment element ABCDEF (100 μrad) inserted at the point z in the resonator gives starting coordinates for the optical axis, which is reproduced "in itself" in a resonator circulation (eigenvector determination). This is represented by the two starting axial beam values (r,r'), where (r,r')=(0,0) if there is no resonator misalignment, i.e. all elements E and F are zero in each case. The effect of the misalignment or of an angle error of an element or of a folding element at a given point z in the resonator on the power of the laser can be calculated from this "eigenaxis" (r,r') by propagating this as a beam from the beginning of the resonator to the laser medium—once again by means of the ABCDEF method. If the axial beam at the point of the laser medium is given by (r_med,r_med'), in particular the value r_med determines the shift of the optical axis at the laser medium out of the optimum state, where this optimum state would be given by r_med=0. The relative shift of the optical axis out of the optimum in relation to the mode radius w_med prevailing there then gives a quantitative measure of the sensitivity of adjustment of the laser resonator for the specific misalignment. This is stated in %. Values of 20% (i.e. r_med/w_med=0.2=20%) with the use of a misalignment element ABCDEF (100 μrad) or even 50% or above give as a rule a noticeable tilt sensitivity, and values substantially above this give an undesired high tilt sensitivity.

The beam attitude parameters of the output beam of the laser are of interest since a laser is usually integrated into an optical application system which has tolerances for the incoming laser beam in its attitude, i.e. position and angle, at a defined point. In addition to the effect of the tilting of an element on the power of the laser, the extent to which these beam attitude parameters change relative to the optical axes at the outcoupling mirror of the laser is therefore also of interest. This can be calculated by the same method, namely by means of propagation of the starting axial beam values (r,r') through the laser by means of ABCDEF matrix calculation up to the outcoupling mirror, provided that the outcoupling mirror does not in any case correspond to the beginning of the resonator.

The coupling, according to the invention, of at least two components with opposite tilt sensitivity or the optically effective surfaces thereof to give an—insensitive—common resonator element can likewise be considered on the basis of the formalism described. In this case, there are two components which, by means of their optical surfaces, on tilting by an angle error, achieve the identical effect or substantially the same effect but with opposite sign.

It should be borne in mind that the calculation so far describes only the tilting about the axis of the element itself. The present proposed arrangements are therefore very particularly suitable for compensating the problematic mounting of each component "by itself" or in combination with another as a resonator element. If, however, the base component or base plate changes, for example is deflected owing to prevailing pressure conditions or temperature gradients, not only is there pure tilting at the point of the individual resonator elements or of the individual components but this change is accompanied by a transverse shift of the respective element. This is not relevant for flat mirrors but is relevant in the case of curved mirrors, where a contribution of the lateral shift can in the end once again be described as an—additional—contribution to the tilting, which is dependent on the radius of curvature.

This can occur as a function of the air pressure if, for example, the laser arrangement contains a gas filling or a vacuum, but also owing to temperature gradients due to introduced or flowing heat and the ageing of the material of the base component and also of the surface and its tension. The resulting tilting and shifting of the individual components as a result can serve as input for an ABCDEF calculation, it also being possible specifically to use the E matrix element in addition to the F element.

In order to ensure appropriate robustness and stability, the individual components are subjected to a sensitivity analysis, so that possible groups of two or three components which show opposite reaction to the deflection can be identified and investigated. In particular, targeted positioning and connection of folding mirrors with further components of the resonator can be utilized in order to permit grouping of components with opposite sensitivity and the connection thereof to give a common resonator element.

The concept of the grouping of two components having opposite sensitivity can be extended analogously to include the grouping of more than two components with overall mutually compensating tilt sensitivity.

The components to be combined here or the optical surfaces thereof may be either identical or different, an optical surface being understood as meaning a surface interacting with the radiation led over the resonator beam path. Thus, the surfaces may be primarily reflective surfaces, i.e. surfaces of folding or end mirrors having planar or curved mirror surfaces and may also be transmitting surfaces, for example of the laser medium or of the outcoupling mirror. Likewise, the two effects can be combined, for example in outcoupling mirrors or at surfaces of the laser medium, so that both reflection and transmission take place. Here, the surfaces of a resonator element may have either identical or different radii of curvature and may be oriented with optical axes parallel or at an angle to one another.

The basis for identification of suitable components which can be grouped or combined and the determination of the parameters of the arrangement of the optical surfaces relative to one another in the resonator element, as well as its positioning and orientation in the beam path of the laser resonator, are effected with the use of the ABCDEF formalism described.

The laser arrangement according to the invention and the resonator element according to the invention are described in more detail or explained below, purely by way of example, with reference to working examples shown schematically in the drawing. Specifically, FIG. 1 shows the schematic diagram of a laser arrangement of the prior art;

FIG. 2 shows the schematic diagram of mirror elements in a laser arrangement of the prior art;

FIG. 3 shows the schematic diagram of the use of a first working example of a resonator element according to the invention in a laser arrangement according to the invention;

FIG. 4 shows the schematic diagram of the first working example of the resonator element according to the invention;

FIG. 5 shows the schematic diagram of a second working example of the resonator element according to the invention;

FIG. 6 shows the schematic diagram of a third working example of the resonator element according to the invention;

FIG. 7 shows the schematic diagram of a fourth working example of the resonator element according to the invention;

FIG. 8 illustrates the tilt sensitivity of a folding mirror for a first example of a laser resonator;

FIG. 9 illustrates the tilt sensitivity of a folding mirror for a second example of a laser resonator and FIG. 10a-b show the schematic diagram of a laser arrangement according to the invention in which the at least two optical surfaces are formed by two different reflection points of a common curved surface.

Figure 1:
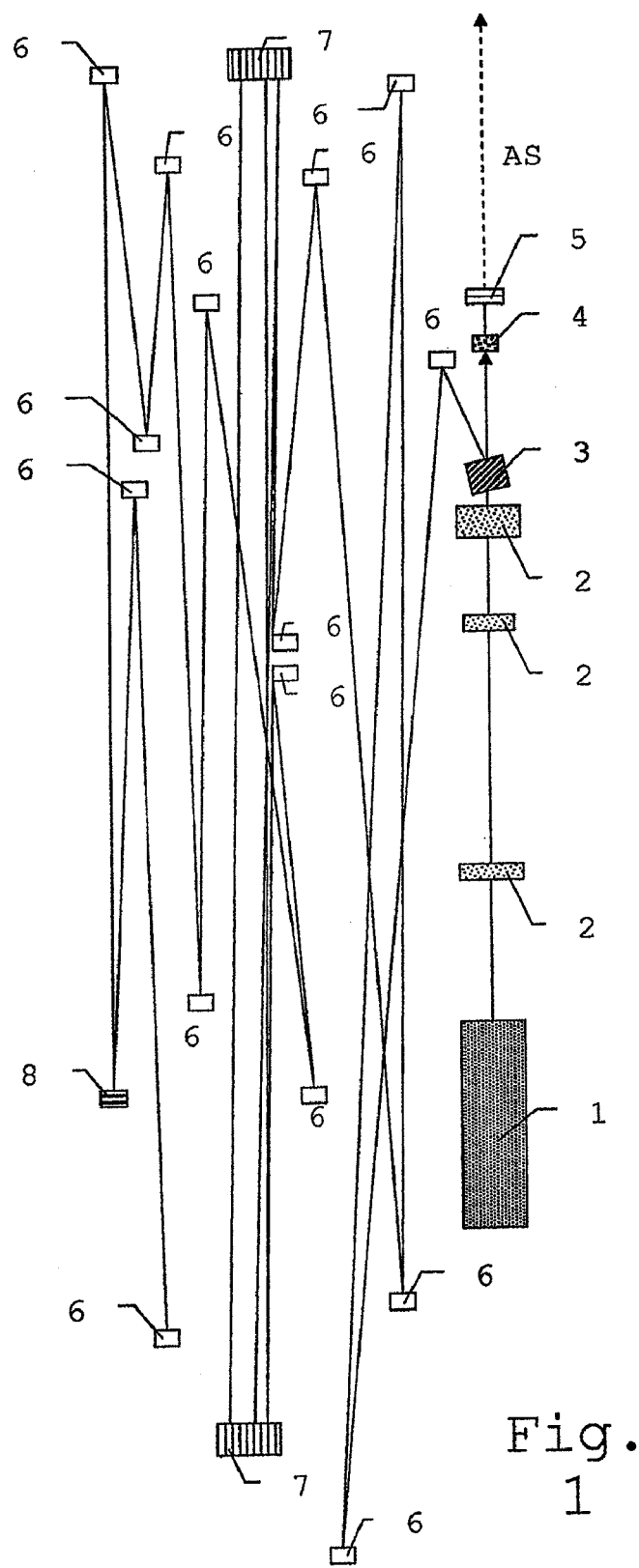

FIG. 1 shows the schematic diagram of a laser arrangement in the form of an ultra-short pulse laser system for producing femto- and picosecond pulses as an example of a laser arrangement of the prior art. Here, the laser arrangement has at least one pump source 1, in particular a laser diode source, for pumping an amplifying laser medium 4 for producing a laser emission, the pump beam path being led via a sequence of lenses 2 as an incoupling optical system and a dichroic pump mirror 3. The coupling-out of the useable laser emission AS is effected via an outcoupling mirror 5 downstream of the laser medium 4. In this example, Yb:KYW is used as laser medium 4, which is placed within the laser resonator with a plurality of curved or planar resonator mirrors 6, i.e. folding or end mirrors. The laser resonator also has two Herriot mirrors 7 and a saturable absorber mirror 8 as a component for producing mode coupling. These components present in the laser resonator, with their optical surfaces, can be grouped according to the invention and combined to give resonator elements where the compensation effect according to the invention is ensured.

The ultra-short pulse laser system shown by way of example is specifically in the form of a femtosecond laser with Yb:KYW or Yb:KGW as laser medium 4, with a 30 W laser diode at 980 nm as pump source 1, a 7.5 m long resonator, i.e. a pulse repetition rate of 20 MHz, coupling out of 6.5% and a pulse length of from 250 to 300 fs at a central wavelength of 1040-1045 nm. The saturable absorber mirror 8 serves for starting and stabilizing the mode coupling. The laser is operated in the soliton mode-coupling range and contains four GTI laser folding mirrors 6 having a negative group velocity dispersion of 500 $fs^2$. It requires no external pulse compression, for example in contrast to the chirped-pulse mode. This and further laser arrangements can, however, also be formed, for example, as restorable amplifiers, i.e. as laser amplification arrangements.

FIG. 2 shows the schematic diagram of mirror elements in such a laser arrangement or a similar laser arrangement of the prior art, only one laser medium 2', for example as a disk laser, i.e. in thin-disk geometry, an end mirror 6' and an outcoupling mirror 5' being shown and considered here purely by way of example and for illustrative reasons. The beam path SG from which the laser radiation LS to be used is coupled out via the outcoupling mirror 5' is defined by these components present in the laser resonator. Here, laser medium 2' and end mirror 6' have planar optical surfaces, whereas the outcoupling mirror 5' carries a curved surface. These optical surfaces interact with the laser radiation in the laser resonator and define or influence the beam path SG in the laser resonator by their reflective, focusing or refractive interaction, said beam path within the laser resonator being formed at least partly by free-beam optics. Depending on the length of the housing into which this resonator is to be integrated, a plurality of folding mirrors not shown here for reasons of simplicity can also be used.

In the example shown, the outcoupling mirror 5' may have a radius of curvature of 500 mm, the distances between laser medium 2' and outcoupling mirror 5' and between laser medium 2' and end mirror 6' being 1000 mm in each case. A thermal lens having a focal length of 800 mm is present in the laser medium 2'. In this exemplary arrangement, for example, a shift of the optical axis in the laser medium 2' to the extent of 13.37% of the mode radius in the laser medium 2' results on tilting of the outcoupling mirror 5'. In the case of a theoretical mode radius of 1.0 mm in the laser medium 2', the shift of the mode corresponds to 134 µm as a result of the tilting of the outcoupling mirror 5' by 100 µrad out of the optimum attitude. In order to avoid the power loss due to the non-optimum passage of the laser mode through the spot of the laser medium 2', an element is now sought which has the same absolute tilt sensitivity but with the opposite sign. This is found in the component of the end mirror 6', which has a theoretical sensitivity of −13.4%. The integration of this specific laser cavity is effected by the location and choice of folding elements or folding mirrors not shown here, in such a way that the two components, outcoupling mirror 5' and end mirror 6', are adjacent to one another and can therefore be combined to form a monolithic element or to form a resonator element which carries both optical surfaces and is mounted only once on the base component or base plate. By mounting or integration of both mirror elements on a mounting plate of the same material as the mirror substrate or direct monolithic formation of the surfaces on a homogeneous substrate, it is possible to avoid the transition between different materials, with the result that no differential expansion occurs in the case of a temperature change. One of the main problems of the prior art is thus avoided, namely that different materials having different coefficients of thermal expansion come into contact with one another and can shift relative to one another, irreversibly in certain circumstances.

Such integration and formation on a homogeneous substrate as resonator element 9 according to the invention and the use thereof in a laser arrangement according to the invention are shown in a schematic diagram in FIG. 3. By combining the two original components, outcoupling mirror 5' and end mirror 6', i.e. the optical surfaces thereof as surfaces interacting with the radiation led via the beam path, into a monolithic resonator 9, the tilt sensitivity is eliminated. This means that, in the case of pure tilting of the resonator element 9 out of the optimal attitude, no shifting of the laser mode at the location of the laser medium 2' results. The laser mode is still perpendicular to both surfaces of the tilted resonator element 9 and the attitude of the outcoupling beam has thus changed, as can be calculated numerically by the ABCDEF method described above. However, it is also possible, according to the invention, to combine further components of the laser resonator to form a resonator element 9; for example, its two mirror surfaces can also define or replace an end mirror and a folding mirror, or a mirror surface and the laser medium 2' are combined so that one side of the laser medium 2' defines an optical transmission and reflection surface.

The above-described laser resonators having a beam path with a length of at least 20 cm, in particular a length of more than 50 cm, and hence the corresponding laser arrangements of the prior art can be modified according to the invention by such a resonator element 9 arranged in the beam path SG and having two mirror surfaces or one mirror surface and one optical transmission surface as two optical surfaces, particular suitability existing for pulse repetition frequencies in the MHz range, in particular for a pulse repetition frequency in the range of 1-120 MHz. The optical surfaces are rigidly connected to one another and adjustable together in the beam path so that, on tilting by an angle error, they achieve substantially the same effect on the guidance of the beam path but with opposite sign, so that mutual compensation of tilting errors to at least 50%, in particular more than 75% or even 90% or more, based on a shift-sensitive reference point, takes place. Such a reference point may be, for example, an entry surface of the laser medium, the outcoupling mirror, a transmission optical system or another aperture in the resonator. The resonator element 9 can be mounted on a base component or base plate having at least one further optical element.

FIG. 4 shows the schematic diagram of the first working example of the resonator element 9 according to the invention, having a monolithic, homogeneous substrate material on which a first and a second mirror surface are formed as optical surfaces. Owing to the integral formation on the common support substrate, the two surfaces are rigidly connected to one another and are adjustable together in a beam path by an adjustable mounting component which carries this resonator element 9 and is not shown. For example, glass or (glass) ceramic, but also metal, can be used as suitable materials, it being possible to realize the mirror surfaces by pure shaping but also by application of reflective coatings.

In addition to being formed from a homogeneous substrate material, the resonator element 9 according to the invention can also be assembled from individual part-elements, i.e. may be composed of different parts of identical material or material sufficiently similar in expansion behavior so that no transitions or few transitions are present between different materials or with materials and in a manner such that only a slight differential expansion takes place, so that the resulting stress due to a temperature or pressure change or due to other effects, for example ageing effects, does not lead to any shift between the parts or to any fracture. Some such examples are shown in FIG. 5-6.

FIG. 5 shows a schematic diagram of a second working example of the resonator element 9' according to the invention, having an arrangement of optical surfaces which is similar to the first working example. However, in this case, the two optical surfaces are each formed on separate part-elements 9b and 9c which are arranged on a common support element 9a. Specifically, a part-element 9b is provided with a radius of curvature, whereas the other part-element 9c carries a planar mirror. The part-elements 9b and 9c and the support element 9a are preferably formed from a material or homogeneous substrate material having substantially the same thermal expansion behavior, for example from glass or ceramic. Part-elements 9b and 9c and support element 9a are then firmly connected to one another according to a defined orientation, in particular by means of optical contacting, diffusion bonding, chemically activated bonding, cementing, adhesive bonding or soldering. Glass substrates can be prefabricated with very exact angles so that precise prefabrication according to calculated angle specifications can be ensured.

A third working example of the resonator element 9" according to the invention is shown in FIG. 6, the two mirror surfaces having the same radius of curvature and being formed as identical part-elements 9b here. The two part-elements 9b are arranged on the support element 9d in such a way that the optical axes of the two mirror surfaces are oriented at an angle to one another. For this purpose, the support element 9d is formed in such a way that the holding surfaces for the respective base of the two part-elements 9b are angled relative to one another. This angle can be determined beforehand according to the ABCDEF formalism and can be precisely established by grinding a glass block embodying the support element 9d.

FIG. 7 shows the schematic diagram of a fourth working example of the resonator element 9''' according to the invention, in this case the support element 9d being formed in a manner identical to FIG. 6, with angled holding surfaces, whereas the mounted part-elements 9b and 9c correspond to those from FIG. 5. Thus, a curved mirror surface and a planar mirror surface are combined with one another in an angled arrangement, the part-element 9c, owing to its shape, also already having an angle of the surface normals with the base of the part-element 9c. Owing to the resulting degrees of freedom, a multiplicity of specifically adapted resonator elements 9''' can be realized.

FIG. 8 illustrates the tilt sensitivity of a folding mirror for a first example of a laser resonator according to the example shown in FIG. 2. The left vertical axis designates the mode radius in mm and the right vertical axis designates the relative tilt sensitivity (in %) in the case of tilting of a (fictitious) folding mirror at the point z (in mm) of the resonator. Here, the resonator is shown unfolded: z=0 corresponds to the outcoupling mirror 5', z=2000 mm corresponds to the end mirror 6'. At the position z=1000 mm, the laser medium 2' is present with a radius of curvature of 1600 mm or with a total thermal lens of f_thl=800 mm. The relative tilt sensitivity is obtained from the axial shift of the optical axis of the eigenmode of the laser resonator at the location of the laser medium 2' in relation to the laser mode at the same point on tilting of the (fictitious) folding mirror by 100 μrad.

The end elements of the resonator have a tilt sensitivity which is lower by a factor of 2 since said end elements reflect only once per circulation, in contrast to folding elements. Here, the mode radius is plotted as a solid line and the resonator tilt sensitivity as a dashed line. The position of the components is marked by the solid boxes whereas their tilt sensitivity is indicated by the unfilled boxes.

FIG. 9 shows the mode curve and the tilt sensitivity for the example of a second resonator, shown analogously to FIG. 8, i.e. the left vertical axis once again designates the mode radius in mm and the right vertical axis the relative tilt sensitivity (in %) on tilting of a resonator element at the point z (in mm) of the resonator. Here, the resonator is shown unfolded. This resonator has in each case two planar end mirrors as first and second element, between which are arranged a mirror having the radius of curvature of 300 mm as a third element #3 altogether, a mirror having the radius of curvature of 500 mm as the ninth element #9 altogether and a mirror having the radius of curvature 400 mm as the fifteenth element #15 altogether and numerous planar folding mirrors. The laser medium used has a thickness of 2 mm and is installed directly at the first element. In this arrangement, the planar folding mirror arranged as second element #2 shows a relative tilt sensitivity of +36.6%, and the curved folding mirror as ninth element #9 shows a relative tilt sensitivity of −36.6%, as is evident form the graph. An arrangement such that these two mirrors are located side by side and mounted in a mutually stable manner results in virtually perfect compensation of the tilt sensitivity, so that the resulting element shows virtually no more tilt sensitivity.

FIG. 10*a-b* show the schematic diagram of a part of a laser arrangement according to the invention, in which the at least two optical surfaces are formed by two different reflection points of a common curved surface and are arranged in such a way that they interact in each case at least twice per reactor circulation with the radiation led via the beam path. In most cases, both optical surfaces are formed as separate surfaces, i.e. as surfaces having distinguishable optical properties, such as, for example, reflectivity, radius of curvature or orientation of the surface normals, but in particular having a discontinuous variation of the surface shape. As a further possibility, however, it is also possible according to the invention to use a continuous curved surface by using two different reflection points or reflection regions of the surface. In this case, the functionality otherwise realized by the separated surfaces is achieved only by the local separation of the interaction in the case of twice the number of interactions with the same element. The same element having a surface which is not separated is thus utilized several times, the locations of the interaction on the continuous surface being different. Thus, a single curved surface experiences two reflections for each single resonator circulation, the tilt sensitivity, analogously to the description above, once again having the opposite sign in each case and overall ensuring compensation at least to a large extent, but as far as possible to 100%.

FIG. 10a and FIG. 10b differ only in the three-dimensional attitude of the components and have a fundamentally identical sequence. In both cases, a sequence comprising a distance f to be covered, reflection at a curved surface of a resonator element 10 having the radius of curvature R=f·2, a further distance f to be covered, a flat folding mirror 6", a further distance f to be covered, another reflection at a different location of the curved surface having a radius of curvature R=f·2, a further distance f to be covered, and reflection at a flat end mirror 6' or a further element of the resonator results. This arrangement can be installed in a flexible manner as the end of virtually any resonator, with the result that the cavity is extended. One of the two or both flat mirrors 6', 6" of FIG. 10b can be in the form of, for example, a semiconductor saturable absorber mirror (SESAM). A particular advantage of a resonator designed in this manner is that, on tilting of the curved surface, a parallel shift of the beam takes place at the end mirror but the laser condition is always maintained and hence the power of the laser is not adversely affected. The arrangement need not necessarily be mounted at the end of the resonator. By means of such an extension of the resonator, the circulation time for a pulse in the resonator is prolonged and hence the pulse energy for a power is increased.

The examples are shown only schematically and for illustrating the laser arrangement according to the invention, so that the size relations, spacings of the components or angles are not reproduced exactly and true to scale.

The invention claimed is:

1. A Laser arrangement, in particular for producing or amplifying femto- or picosecond pulses, comprising:
   a laser medium for producing a laser emission,
   a laser resonator having a beam path with a length of at least 20 cm, having at least one end mirror,
   wherein the beam path within the laser resonator is formed at least partly by free-beam optics, wherein a resonator element arranged in the beam path and having at least two optical surfaces as surfaces interacting with a radiation led via the beam path,
   the at least two optical surfaces being rigidly connected to one another and arranged together in the beam path, in such a way that, on tilting by an angle error, substantially the at least two optical surfaces have the same effect on guidance of the beam path but with an opposite sign, so that mutual compensation of tilt errors takes place, based on a shift-sensitive reference point.

2. The Laser arrangement according to claim 1, wherein at least two optical surfaces are each formed on separate part-elements which are arranged on a common support element, the optical surfaces.

3. The Laser arrangement according to claim 2, wherein the part-elements and the support element are formed from a material having substantially the same thermal expansion behavior.

4. The Laser arrangement according to claim 2, wherein the part-elements and the support element are connected to one another by at least one of optical contacting, diffusion bonding, chemically activated bonding, cementing, adhesive bonding or soldering.

5. The Laser arrangement according to claim 1, wherein the at least two optical surfaces are formed integrally on a common support substrate.

6. The Laser arrangement according to claim 1, wherein the resonator element is mounted on a base component having at least one further optical element.

7. The Laser arrangement according to claim 1, wherein the at least two optical surfaces are formed by two different reflection points of a common, curved surface and are arranged so that they interact in each case at least twice per resonator circulation with the radiation led via the beam path.

8. The Laser arrangement according to claim 1, wherein the at least two optical surfaces define the end mirror and a folding mirror.

9. The Laser arrangement according to claim 1, wherein the at least two optical surfaces represent two mirror surfaces having the same or a different radius of curvature.

10. The Laser arrangement according to claim 1, wherein the optical axes of the at least two optical surfaces are oriented at an angle relative to one another.

11. The Laser arrangement according to claim 1, wherein one of the at least two optical surfaces has transmitting character.

12. The Laser arrangement according to claim 1, wherein the laser arrangement is formed for producing mode coupling.

13. The Laser arrangement according to claim 1, wherein the laser arrangement is formed as a restorable amplifier.

14. The Laser arrangement according to claim 1, wherein the laser arrangement is designed for a pulse repetition frequency in the MHz range.

15. A Resonator element for arrangement in the beam path of a laser resonator in a laser arrangement according to claim 1, comprising
   a first optical surface as a surface interacting with the radiation led via the beam path and
   an adjustable mounting component for connection to a base component having at least one further optical element,
wherein at least one second optical surface, is a surface configured to interact with the radiation led via the beam path, the first and second optical surfaces being rigidly connected to one another and being capable of being positioned by an adjustable mounting element together in the beam path in such a way, that, on tilting by an angle error, substantially the same effect on the guidance of the beam path is achieved but with opposite sign, and wherein mutual compensation of tilt errors takes place based on a shift-sensitive reference point.

16. The Laser arrangement according to claim 3, wherein the part-elements and the support element are firmly connected to one another.

17. The Laser arrangement according to claim 1, wherein the laser resonator has a beam path with a length of more than 50 cm.

18. The Laser arrangement according to claim 1, wherein the mutual compensation of tilt errors takes place to at least 50% based on the shift-sensitive reference point.

19. The Laser arrangement according to claim 1, wherein the mutual compensation of tilt errors takes place to more than 75% based on the shift-sensitive reference point.

20. The Laser arrangement according to claim 1, wherein the at least two optical surfaces are separate.

21. The Laser arrangement according to claim 1, wherein the at least two optical surfaces are adjustable together.

22. The Laser arrangement according to claim 1, wherein the at least two optical surfaces are reflective.

23. The Laser arrangement according to claim 1, wherein at least one of the at least two optical surfaces is a curved surface.

24. The Laser arrangement according to claim 1, wherein the laser arrangement is a mode-coupled laser.

25. The Laser arrangement according to claim 3, wherein that the part-elements and the support element are from a substrate material having a same coefficient of thermal expansion, or are formed from the same substrate material.

26. The Laser arrangement according to claim 3, wherein the part-elements and the support element are glass or ceramic.

27. The Laser arrangement according to claim 16, wherein the part-elements and the support element are firmly connected to one another by at least one of optical contacting, diffusion bonding, chemically activated bonding, cementing, adhesive bonding or soldering.

28. The Laser arrangement according to claim 1, wherein the resonator element is mounted on a base plate.

29. The Laser arrangement according to claim 1, wherein one of the at least two optical surfaces is one side of the laser medium or of an outcoupling mirror.

30. The Laser arrangement according to claim 14, wherein the laser arrangement is designed for a pulse repetition frequency in the range of 1-120 MHz.

31. The Laser arrangement according to claim 2, wherein the mutual compensation of tilt errors takes place to at least 50% based on a shift-sensitive reference point.

32. The Laser arrangement according to claim 2, wherein the mutual compensation of tilt errors takes place to more than 75% based on a shift-sensitive reference point.

33. The Laser arrangement according to claim 1, wherein the second optical surface is separated from the first optical surface.

34. The Laser arrangement according to claim 1, wherein the first and the second optical surface are adjustable together.

35. The Laser arrangement according to claim 3, wherein the part-elements and the support element are firmly connected to one another by a least one of optical contacting, diffusion bonding, chemically activated bonding, cementing, adhesive bonding or soldering.

* * * * *